(12) United States Patent
Prague

(10) Patent No.: US 7,223,360 B2
(45) Date of Patent: May 29, 2007

(54) METHOD OF MOLDING DECORATIVE ELEMENTS FOR CONSUMER PACKAGING

(75) Inventor: David J. Prague, New Milford, CT (US)

(73) Assignee: RII Acquisition Corp., Watertown, CT (US)

( * ) Notice: Subject to any disclaimer, the term of this patent is extended or adjusted under 35 U.S.C. 154(b) by 445 days.

(21) Appl. No.: 10/285,189

(22) Filed: Oct. 31, 2002

(65) Prior Publication Data

US 2004/0084813 A1   May 6, 2004

(51) Int. Cl.
*B29C 41/02* (2006.01)

(52) U.S. Cl. ............... 264/496; 264/250; 264/255; 264/494; 427/508

(58) Field of Classification Search ............ 264/496, 264/259, 494, 250, 255; 427/508
See application file for complete search history.

(56) References Cited

U.S. PATENT DOCUMENTS

| 4,856,857 | A | * | 8/1989 | Takeuchi et al. | 359/3 |
| 4,946,531 | A | * | 8/1990 | Crouch et al. | 156/242 |
| 5,885,514 | A | * | 3/1999 | Tensor | 264/478 |
| 5,995,690 | A | * | 11/1999 | Kotz et al. | 385/25 |
| 6,649,216 | B2 | * | 11/2003 | Gust et al. | 427/173 |

* cited by examiner

*Primary Examiner*—Allan R. Kuhns
(74) *Attorney, Agent, or Firm*—St. Onge Steward Johnston & Reens LLC

(57) ABSTRACT

A method of molding a decorative product packaging, comprising the steps of: molding a product container or cap; applying a UV curable liquid to surfaces and/or cavities in the container or cap; then exposing the UV curable liquid to UV radiation to form a solid coating adhered to surfaces and/or filling cavities on the container or cap. The present invention provides dramatic effects, particularly where the container or cap are clear or tinted, because the solid coating can be tinted a contrasting color, providing a striking contrast to the container or cap.

8 Claims, 1 Drawing Sheet

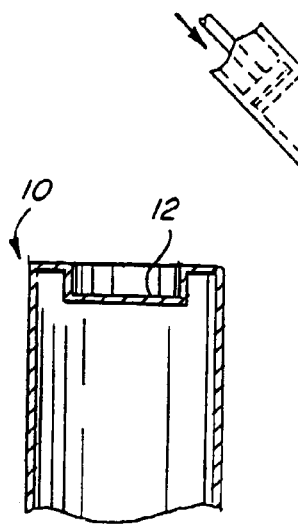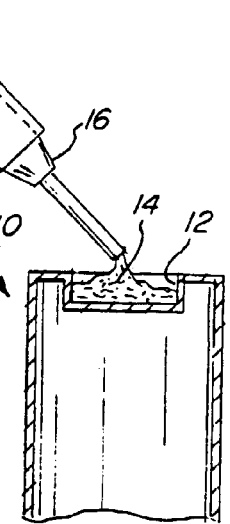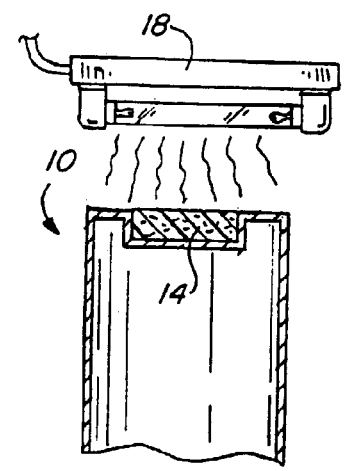
FIG. 1A　　　　FIG. 1B　　　　FIG. 1C
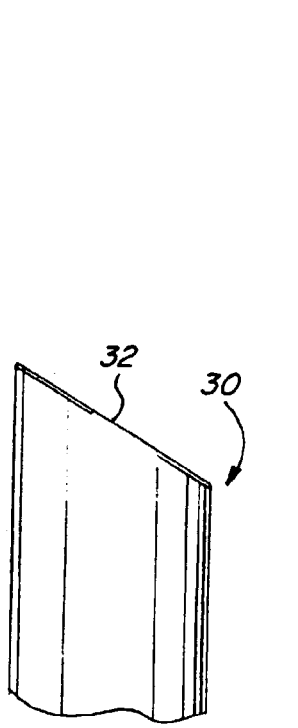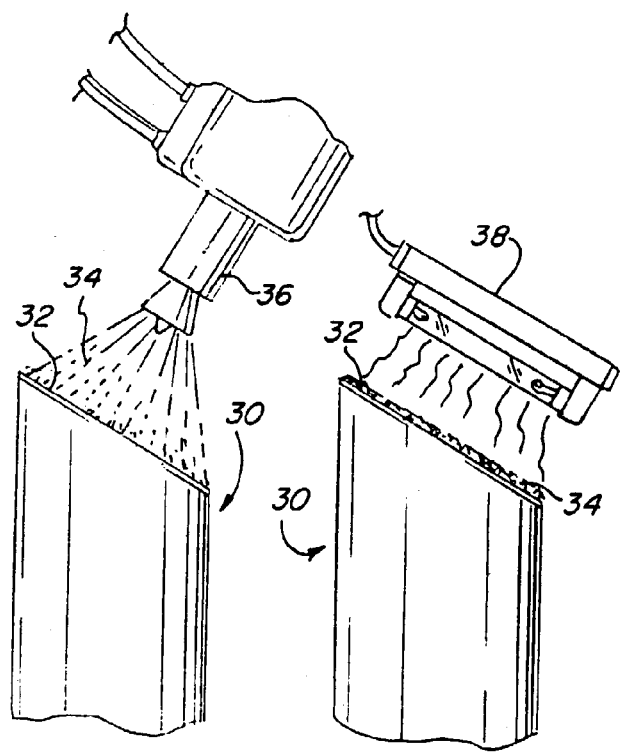
FIG. 2A　　　　FIG. 2B　　　　FIG. 2C

METHOD OF MOLDING DECORATIVE ELEMENTS FOR CONSUMER PACKAGING

FIELD OF THE INVENTION

The present invention relates to manufacturing methods used to provide consumer packaging, particularly, cosmetic cases, with attractive colored coatings and molded colored elements.

BACKGROUND OF THE INVENTION

The cosmetic industry serves a range of markets, from young teenagers to older, more mature customers. In the more upscale markets it is desirable for the cosmetic packaging to project elegance and sophistication, particularly where the product is priced at a relatively high price point. In a more youthful market, marketers are prefer a younger, fresher, or funky look.

It would be desirable to provide a method and process for providing a new decorative element suitable for consumer packaging that is eye-catching, and which gives the appearance of high cost and quality, yet which can be fabricated very economically.

SUMMARY OF THE INVENTION

A method of molding a decorative product packaging, comprising the steps of: molding a transparent or semi-transparent or opaque product container or cap; applying a UV curable liquid to surfaces and/or cavities in the container or cap; then exposing the UV curable liquid to UV radiation to form a solid coating adhered to surfaces and/or filling cavities on the container or cap. The present invention provides dramatic effects where the container or cap are clear or tinted, and essentially transparent, because the solid coating can be clear or colored, and provides a striking contrast to the container or cap. However, the invention is effective and useful also where the container or cap are opaque, instead or clear or tinted.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIGS. 1A–1C shows a side elevation view of an embodiment of a cosmetic container cap made in accordance with the methods of the present invention showing a series of steps of using the UV curable liquid in a cavity.

FIGS. 2A–2C is a side elevation view of an embodiment of a cosmetic container made in accordance with the methods of the present invention showing a series of steps of using the UV curable liquid applied to a container surface.

DETAILED DESCRIPTION OF THE DRAWINGS

The present invention is applicable to clear, tinted or opaque substrates, and is particularly suited for clear and tinted cosmetic containers and caps that will benefit from a dramatic surface coating or filled cavity in a contrasting color. However, the invention as claimed herein is not limited to specific applications, and the term substrate should be understood to broadly encompass not only molded products, but virtually any product of any materials, including materials which are clear, tinted or opaque, and which can be selected from plastic, rubber, metal, stone, glass, wood, ceramic, and composites thereof.

Generally, the invention comprises the steps of: forming a substrate having a plurality of surfaces and/or a cavity therein; applying to one or more of said surfaces, or filling said cavity, with a UV curable liquid; and exposing said UV curable liquid to a UV light source of a sufficient intensity and for a sufficient time to cure said UV curable liquid to a solid mass contained in said cavity.

The UV curable liquid is can be selected from a number of different UV curable polymer systems. A UV curable polymer system typically comprises 1–3% of a photoinitiators; 15–60% of reactive diluents, 25%–90% of an oligomer polymer; and 1–50% of additives and fillers. Polymers used in UV curable polymer systems can include polyurethanes, epoxies, polyesters and acrylates. Specific commonly used monomers for the polymer include N-vinylpyrrolidone, hydroxyethylacrylate, (poly)ethyleneglycol diacrylate, trim-ethylolpropanetriacrylate, norbornylacrylate, and styrene. Another suitable polymer system is the thiol-ene polymer system (also known as mercaptoesters). Commercially available UV curable polymer systems include products from Master Bond, Inc., Hackensack, N.J., Tangent Industries, Winsted, Conn.; Daicel Chemical Industries, Ltd., Sakai Osaka Japan, and Ctech LLC, New Hartford, Conn. A suitable thiol-ene polymer system is available from Ctech, LLC. The preferred UV curable liquid is a product that when cured will have good optical qualities, as this is typically indicative of the finish and look desired in the process of the invention. These products are typically cured at ambient temperatures, or at temperatures at or below 100° C. using a UV light source. Typical cure times range from 5 seconds to 5 minutes depending upon the wave length and intensity of the UV light and the thickness being cured. The preferred UV curable liquid is an acrylate formulation. One commercially available formulation that could be used in the invention is the Ctech 8166-4A formulation, which can be cured to a tack free surface with 5 minutes UV exposure at 100° C. A preferred UV light source is a UV lamp providing a UV intensity of is about 115 mW/cm2 at 365 nm. The UV light source desirably provides a broad range of wavelengths from 250–500 nm, which will cure materials much faster than if only the 365 nm radiation were delivered.

The UV curable liquids can be tinted to a specific color to provide a visually striking color depth, or additives and fillers can be used to provide a metallic or pearly appearance. Also glitter or flake fillers can be added—to give a glitter appearance. Dense metallic fillers can be used to increase the mass of the package.

Where UV curable liquid is to be used as a coating it is applied one or more surfaces of the substrate using a precision dispensing system. A dip process may also be used for a coating of UV curable liquid. The surface should be clean and dry, but otherwise no particular surface preparation or pretreatment is required. It has been found that the method of the invention results in a coating in which gate marks, gate wells, frosting, cutter marks, and cuts and abrasions in the substrate surface virtually disappear, even though the coating is transparent or semi-transparent. The material can be applied as a uniform coating on the substrate to provide a smooth finish, or only to selected parts of the substrate to provide an embossed effect.

Where UV curable liquid is to be used as a plug in a cavity it is provided in the cavity using a precision dispensing system to provide the correct amount of liquid. Again, the cavity is preferably clean and dry, but no particular surface pretreatment is required. The cavity shapes may be selected from all types of designs, including ornamental designs, and lettering (such as a product brand), and logos. The cavity may be formed by molding the substrate or by cutting or other mechanical means.

The UV curable liquid can be applied directly to a substrate in a free form, pattern or design, and cured, providing a product with an embossed surface texture where the liquid is applied.

The UV curable liquid can be used to increase the shape of thickness of the substrate as well as acting as a decorative coating. In some cases, the UV curable liquid can be used for functional purposes, such as to strengthen the substrate or to act as a mechanical lock between two components.

In another embodiment, the UV curable liquid can be poured in multiple layers to provide a desired effect of appearance. For example, there may be multiple layers of differently tinted liquids poured. Or a first layer may be poured, and then decorative elements such as glitter, confetti type plastic dots or shapes, or decals, surface decoration, medallions/logos, or name plates may be placed on the first layer, and another layer poured, to provide the effect of decorative elements embedded between two or more layers of the UV curable liquid. This process can be extended to include three, four or more layers, with decorative elements placed between some or all of such layers. In such cases, the multiple layers and decorative elements can be applied to the substrate then a final UV curing step can take place, or the UV curing step can take place after each layer of UV curable liquid is applied to the substrate.

Referring now to FIG. 1A, a cosmetic container cap 10 is shown having a cavity 12. FIG. 1B shows the delivery of a UV curable liquid 14 in a cavity 12 by a precision dispensing system 16. FIG. 1C shows a step of curing the UV curable liquid 14 by exposure to a UV lamp 18 to cure and set the UV curable liquid 14.

Referring now to FIG. 2A a cosmetic container cap 30 is shown having a surface 32. FIG. 2B shows the delivery of a UV curable liquid 34 to surface 32 by a precision dispensing system 36. FIG. 2C shows a step of curing the UV curable liquid 34 by exposure to a UV lamp 38 to cure and set the UV curable liquid 34.

The finished product made using the processes of the invention has a very attractive appearance that is well suited for both an elegant cosmetic product application and a more youth oriented product.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A method of molding a decorative product packaging, comprising the steps of:
    molding a product container or cap, said product container or cap having a plurality of surfaces or one or more cavities therein;
    applying a UV curable liquid to one or more of said plurality of surfaces or to said one or more cavities;
    exposing said UV curable liquid to a UV light source of a sufficient intensity and for a sufficient time to cure said UV curable liquid to a solid coating adhered to said one or more of said plurality of surfaces or to said one or more cavities;
    applying a second UV curable liquid to one or more of said plurality of surfaces or to said one or more cavities;
    exposing said second UV curable liquid to a UV light source of a sufficient intensity and for a sufficient time to cure said second UV curable liquid to a solid coating adhered to said one or more of said plurality of surfaces or to said one or more cavities.

2. A method in accordance with claim 1, wherein said UV curable liquid is untinted such that after exposing said UV curable liquid to a UV light source, said cured solid coating is transparent.

3. A method in accordance with claim 1, wherein said UV curable liquid is tinted such that after exposing said UV curable liquid to a UV light source, said cured solid coating is colored.

4. A method in accordance with claim 1, wherein said substrate comprises a transparent or semi-transparent material.

5. A method in accordance with claim 1, wherein said substrate comprises an opaque material.

6. A method in accordance with claim 1, further comprising placing decorative elements to one or more of said plurality of surfaces or to said one or more cavities or between said layers of UV curable liquid.

7. A method in accordance with claim 1, wherein said UV curable liquid contains one or more of additives, fillers, glitter fillers, flake fillers, and decorative elements.

8. A method in accordance with claim 1, wherein said UV curable liquid is applied to said substrate in a free form, pattern or design to provide said substrate with an embossed surface texture.

* * * * *